United States Patent [19]

Kitazawa

[11] Patent Number: 5,595,700
[45] Date of Patent: Jan. 21, 1997

[54] NON-BAKED COLOR PENCIL LEADS AND METHOD FOR PREPARING SAME

[75] Inventor: Katsunori Kitazawa, Gunma, Japan

[73] Assignee: Mitsubishi Pencil Kabushiki Kaisha, Tokyo, Japan

[21] Appl. No.: 322,090

[22] Filed: Oct. 12, 1994

Related U.S. Application Data

[63] Continuation of Ser. No. 867,820, Apr. 13, 1992, abandoned.

[30] Foreign Application Priority Data

May 2, 1991 [JP] Japan .................................. 3-128227

[51] Int. Cl.$^6$ .......................... B43K 19/02; C09D 13/00
[52] U.S. Cl. .................. 264/211; 106/26 A; 106/25 A; 106/19 B; 264/211.11; 264/211.12; 264/349
[58] Field of Search ........................... 264/122, 211–12, 264/177.1, 211.11, 349; 106/19 B, 25, 25 A, 26, 26 A; 425/32

[56] References Cited

U.S. PATENT DOCUMENTS

| | | | |
|---|---|---|---|
| 1,937,105 | 11/1933 | Thomsen | 106/19 B |
| 2,075,223 | 3/1937 | Pischel | 106/19 B |
| 2,273,935 | 2/1942 | Chesler | 106/19 B |
| 2,355,638 | 8/1944 | Ferst et al. | 106/19 B |
| 2,645,582 | 7/1953 | Loy . | |
| 2,917,777 | 12/1959 | Pischel | 264/210.1 |
| 4,017,451 | 4/1977 | Ishida et al. | 264/211 |
| 4,853,167 | 8/1989 | Bard et al. | 264/122 |
| 4,931,163 | 6/1990 | Watanabe et al. . | |
| 4,950,814 | 8/1990 | Maeda et al. . | |

FOREIGN PATENT DOCUMENTS

| | | |
|---|---|---|
| 48-32020 | 4/1973 | Japan . |
| 49-10861 | 3/1974 | Japan . |
| 49-39124 | 10/1974 | Japan . |
| 49-54332 | 12/1974 | Japan . |
| 49-45331 | 12/1974 | Japan . |
| 49-133122 | 12/1974 | Japan . |
| 49-133123 | 12/1974 | Japan . |
| 51-3245 | 2/1976 | Japan . |
| 51-29048 | 8/1976 | Japan . |
| 51-41374 | 11/1976 | Japan . |
| 55-139472 | 10/1980 | Japan . |
| 56-100874 | 8/1981 | Japan . |
| 56-163172 | 12/1981 | Japan . |
| 58-2369 | 1/1983 | Japan . |
| 58-5952 | 2/1983 | Japan . |
| 58-5953 | 2/1983 | Japan . |
| 58-168672 | 10/1983 | Japan . |
| 58-208360 | 12/1983 | Japan . |
| 59-117570 | 7/1984 | Japan . |
| 59-117569 | 7/1984 | Japan . |
| 59-218896 | 12/1984 | Japan . |
| 60-11872 | 6/1985 | Japan . |
| 61-275370 | 12/1986 | Japan . |
| 62-569 | 1/1987 | Japan . |
| 62-275190 | 11/1987 | Japan . |
| 62-253680 | 11/1987 | Japan . |
| 63-57681 | 3/1988 | Japan . |
| 2-36281 | 2/1990 | Japan . |
| 2-271907 | 11/1990 | Japan . |
| 4-027600 | 1/1992 | Japan . |
| 1267678 | 3/1972 | United Kingdom . |

OTHER PUBLICATIONS

100:105304p, Chem Abstracts (1984).
96:21454y, Chem Abstracts (1982).
JP-A-62 000 569, Patent Abstracts of Japan, vol. 11, No. 167, May 28, 1987.
AN 87–041007, Database WPIL, Week 8706, Apr. 8, 1987.
JP-A-56 100 874, Database WPIL, Week 8139.
62-274190 (A) Abstract.
Solvent Soluble Fluoro–Carbon–Resin, J. Chem. Soc. vol. 44, No. 9 (1991).
T. Mseda et al., New Fluorocarbon Materials by Direct Fluorination of Pitch, 13th International Fluorine Chemistry Symposium in Germany.
Toshiyuki Maeda, Development of the New Fluoro –Carbon Material.
Hiroyuki Fujimoto et al., J. of Fluorine Chemistry 57:65–71 (1992).
Hiroyuki Fujimoto et al., Carbon 30(6):851–857 (1992).
M. Yoshikawa et al. J. of Flourine Chemistry, vol. 58 (1992).

Primary Examiner—Mathieu D. Vargot
Attorney, Agent, or Firm—Darby & Darby

[57] ABSTRACT

Non-baked color pencil leads are obtained by forming a blend composition from a filler, a coloring agent, a binder without any wax, and a water/oil repellant substance, kneading the mixture with a solvent and/or plasticizer, extruding the kneaded material, drying the extruded articles to remove the solvent and/or plasticizer therefrom to form open pores therein owing to the less wettability of the water/oil repellant substance, and then impregnating the pores with an oil, a fat and/or a wax. Since the oil, the fat and/or the wax is not blended into the composition, bleeding does not occur at the time of the drying, which permits drying the articles at a high temperature for a short period of time, whereby the manufacturing cost can be decreased. The thus obtained non-baked color pencil leads are remarkably excellent in physical properties such as bending strength and pointed end strength and have a smooth writing performance.

13 Claims, No Drawings

NON-BAKED COLOR PENCIL LEADS AND METHOD FOR PREPARING SAME

This is a continuation, of application Ser. No. 07/867,820, filed Apr. 13, 1992 now abandoned.

BACKGROUND OF THE INVENTION (i) Field of the Invention

The present invention relates mainly to wood-cased color pencil leads and color pencil leads for mechanical pencils. More specifically, it relates to non-baked color pencil leads which is remarkably excellent in physical properties such as bending strength and pointed end strength and which has a smooth writing performance. Furthermore, it relates to color pencil leads and a method for preparing the same by which the conventional color pencil leads which cannot be erased by an eraser or the color pencil leads which can be erased by the eraser can be selectively prepared and which permits noticeably shortening a drying time and decreasing a manufacturing cost.

(ii) Description of the Prior Art

Conventional non-baked color pencil leads can be prepared by a wet process which comprises, if necessary, dissolving and swelling an organic polymeric material as a binder in a solvent such as water and/or a plasticizer, kneading the same with a wax, a filler, a coloring agent and the like, extruding the kneaded material, and then drying the extruded articles to remove the solvent and/or the plasticizer therefrom.

In this wet process, however, it is necessary that a drying temperature is set to the melting point or less of the wax or the like so as to prevent the bleeding of the wax or the like, and therefore a tremendous period of time is taken in the drying step. Moreover, leads prepared by a dry process, in which the solvent and/or the plasticizer is not used and the drying step is omitted, are also put on the market, but the quality of these leads is inferior to that of the leads obtained by the wet process.

In connection with the strength and the writing performance of the conventional color pencil leads obtained by the wet process, the adhesion of the filler and coloring agent by the binder is partially impeded with the wax or the like, so that the pencil leads are worn at the drawing and exert lubricating properties and a staining power.

However, when the wax or the like is kneaded with a blend composition containing the filler, the coloring agent, the binder and the like, followed by extruding, the effects of the smooth writing performance and the excellent staining power are remarkable, but the deterioration of strength is also large. In consequence, any satisfactory color pencil leads balanced between the strength and the writing performance have not been obtained so far.

On the other hand, the non-baked color pencil leads which are said to be erasable with an eraser are also put on the market, and most of these leads contain the binder, which is a non-polar organic material, and the wax or the like which is a non-polar organic material as the main components in order to be easily removed from the fibers of a paper. In addition, the staining power is increased by softening the leads so as to permit drawing under weak pencil pressure, whereby the lead composition is prevented from getting into between the fibers of the paper at the drawing to obtain erasability.

However, the coloring agent tenaciously sticks between the fibers of the paper at the drawing by the wax or the like, and the lead composition which has once stuck between the fibers of the paper cannot be removed completely by the adsorbing power of an eraser. Thus, this erasability is not practically satisfactory.

The removal of the drawing lines by the adsorbing power of the eraser can be achieved by using the oil, the fat and/or the wax which is liquid at ordinary temperature for all the material of the wax or the like.

However, in the conventional wet process, the drying step is effected by heating at 50°–60° C., and therefore the oil, the fat and/or the wax, which is liquid at ordinary temperature, bleeds and the shape of the leads cannot be maintained any more in the drying step. In consequence, the conventional wet process cannot practically utilize such an oil, fat and/or wax, which is liquid at ordinary temperature.

Thus, it can be conceived that color pencil porous leads are first prepared, and they are then impregnated with the oil, the fat and/or the wax which is liquid at ordinary temperature.

In order to form the open pores in the pencil porous leads, some techniques have been heretofore suggested which are a technique of adding a sublimable material or a pyrolysis material, and techniques such as an acid and an alkali solution treatment. However, in every technique, the heating is carried out at more than the thermal deterioration temperature of an organic pigment, and so the color pencil porous leads having a vivid color cannot be obtained.

The baked color pencil leads are only put on the market which can be prepared by kneading a clay, a white filler, a binder and the like, extruding the kneaded material, baking the extruded articles in an oxygen atmosphere to form baked white pencil porous leads, and then impregnating them with an ink. With regard to these baked color pencil leads, their erasability with the eraser is substantially satisfactory, but the impregnation is carried out by the use of a dye ink, since it is impossible to impregnate the porous leads with a highly concentrated pigment ink. This kind of leads have the problem that they are very poor in light resistance and staining power as compared with the non-baked pencil color leads in which the pigment is used.

SUMMARY OF THE INVENTION

An object of the present invention is to eliminate the drawbacks of the above-mentioned conventional method for preparing non-baked color pencil leads. The first object of the present invention is to provide non-baked color pencil leads which are remarkably excellent in physical properties such as bending strength and pointed end strength and which has a smooth writing performance. The second object of the present invention is to provide a method for preparing the color pencil leads by which the conventional non-baked color pencil leads which cannot be erased by an eraser or the non-baked color pencil leads which can be easily erased by the eraser can be selectively prepared. The third object of the present invention is to provide a method for noticeably shortening a drying time to decrease a manufacturing cost.

The present invention can be summarized as follow:

1. Non-baked color pencil leads obtained by kneading a blend composition containing a water/oil repellent substance, a binder, a coloring agent and a filler, extruding the kneaded material, drying the extruded articles, and then impregnating the open pores of the articles in the circumference of the water/oil repellent substance with an oil, a fat and/or a wax.

2. The non-baked color pencil leads according to the preceding paragraph 1 wherein the water/oil repellent substance is at least one selected from the group consisting of graphite fluoride, carbon fluoride, fluororesin powder such as polytetrafluoroethylene (PTFE), graphite and boron nitride.

3. The non-baked color pencil leads according to the preceding paragraph 1 wherein the water/oil repellent substance is contained in an amount of 2 to 20% by weight based on the total weight of the blend composition.

4. The non-baked color pencil leads according to the preceding paragraph 1 wherein the binder is at least one selected from the group consisting of cellulose derivatives such as carboxymethyl cellulose, methyl cellulose, ethyl cellulose, hydroxyethyl cellulose, hydroxypropyl cellulose, cellulose acetate and cellulose nitrate, polyvinyl alcohol, polyvinyl butyral, polymethyl methacrylate, tragacanth gum, gum arabic, cyamoposis gum, gum dammer and locust bean gum.

5. The non-baked color pencil leads according to the preceding paragraph 1 wherein the filler is at least one selected from the group consisting of talc, clay such as kaolin, and calcium carbonate.

6. The non-baked color pencil leads according to the preceding paragraph 1 wherein the oil, the fat and/or the wax is at least one selected from the group consisting of silicone oil, mineral oils, liquid paraffin, α-olefin oligomer, lard, petroleum waxes such as paraffin wax and microcrystalline wax, carnauba wax, candelilla wax, montan wax, bee's wax, japan wax, synthetic japan wax, caster wax and stearic acid.

7. A method for preparing non-baked color pencil leads which comprises the steps of kneading a blend composition containing at least a water/oil repellent substance, a binder, a coloring agent and a filler with a solvent and/or a plasticizer, extruding the kneaded material, drying the extruded articles to remove the solvent and/or the plasticizer therefrom and thereby to form open pores therein owing to the less wettability of the water/oil repellent substance, and then impregnating the porous articles with an oil, a fat and/or a wax.

8. The method for preparing non-baked color pencil leads according to the preceding paragraph 7 wherein the water/oil repellent substance is at least one selected from the group consisting of graphite fluoride, carbon fluoride, fluororesin powder such as polytetrafluoroethylene (PTFE), graphite and boron nitride.

9. The method for preparing non-baked color pencil leads according to the preceding paragraph 7 wherein the water/oil repellent substance is blended in an amount of 2 to 20% by weight based on the total weight of the blend composition.

10. The method for preparing non-baked color pencil leads according to the preceding paragraph 7 wherein the solvent and/or the plasticizer is at least one compound which can dissolve or swell the binder and which is selected from the group consisting of water, a ketone, an alcohol, a low-boiling point ester, a phosphoric ester, a phthalic ester, an ester of an aliphatic acid and a divalent alcohol ester.

DETAILED DESCRIPTION OF THE INVENTION

The present inventors have intensively researched to solve the above-mentioned problems, and as a result, it has been found that these problems can be solved by a technique of adding a water/oil repellent substance to a blend composition comprising a filler, a coloring agent and a binder without using an oil, a fat and/or a wax in the first step, kneading, extruding, drying, and then impregnating the formed open pores with the oil, the fat and/or the wax. In consequence, the present invention has been completed on the basis of this knowledge.

As the water/oil repellent substance which can be used in the present invention, graphite fluoride, carbon fluoride, fluororesin powder such as PTFE, graphite or boron nitride can be used singly or in combination. However, $(CF)_n$ type graphite fluoride and boron nitride are most preferable, since they are excellent in lubricating properties and they are white and can be used for the color pencil leads.

The amount of the water/oil repellent substance depends upon its surface energy, but it is preferably in the range of 2 to 20% by weight based on the total weight of the blend composition in view of the hardness, the writing performance and the mechanical strength of the leads which depends upon the impregnation ratio of the oil, the fat and/or the wax.

As the oil, the fat and/or the wax with which the leads are impregnated, any one can be used, so long as it is easily permeated into the open pores, even if it is not heated up to a temperature at which the coloring agent thermally deteriorates. Examples of the oil, the fat and/or the wax include known materials, i.e., silicone oil, mineral oils, liquid paraffin, α-olefin oligomer, lard, petroleum waxes such as paraffin wax and microcrystalline wax, carnauba wax, candelilla wax, montan wax, bee's wax, japan wax, synthetic japan wax, caster wax and stearic acid. Needless to say, they can be used singly or in combination.

In order to prepare the leads which can be erased with an eraser as easily as baked black leads for pencils, the oil, the fat and/or the wax which is liquid at ordinary temperature should be selected.

Examples of the binder for the leads of the present invention include synthetic and natural materials, i.e., cellulose derivatives such as carboxymethyl cellulose, methyl cellulose, ethyl cellulose, hydroxyethyl cellulose, hydroxypropyl cellulose, cellulose acetate and cellulose nitrate, polyvinyl alcohol, polyvinyl butyral, polymethyl methacrylate, tragacanth gum, gum arabic, cyamoposis gum, gum dammer and locust bean gum, and they can be used singly or in combination. In view of a drying time, the water-soluble resin and the thermoplastic resin which can dissolve or swell in a low-boiling solvent are preferable, and among these resins, in view of a writing performance and strength, the resins having high bending strength and high stiffness are further preferable.

In blending and kneading the water/oil repellent substance, the filler, the coloring agent and the binder, the solvent and/or the plasticizer may be added, if necessary. When the solvent and/or the plasticizer is used and kneaded, viscosity decreases, which permits uniformly kneading the binder. Since this solvent is finally dried and removed, water which is inexpensive, easy to be handled and safe is most preferable as the solvent. Therefore, as the binder, the water-soluble resin is most preferable, but low-boiling solvents such as a ketone, a lower alcohol and an ester can be also used.

The plasticizer for the binder resin is a plasticizer which is compatible with the thermoplastic resin, and examples of the plasticizer include phosphoric esters such as tributyl phosphate and tricresyl phosphate, phthalic esters such as dimethyl phthalate and dibutyl phthalate, esters of aliphatic acids such as butyl oleate and dibutyl adipate, and a divalent alcohol ester such as diethylene glycol dibenzoate.

Examples of the usable coloring agent in the blend composition include all of known coloring agents such as organic and inorganic pigments.

Furthermore, no particular restriction is put on the filler, and examples of the filler include all of known fillers such as talc, kaolin and calcium carbonate.

A method for preparing non-baked color pencil leads of the present invention comprises the steps of kneading a blend composition containing at least a water/oil repellent substance, a binder, a coloring agent and a filler but not containing an oil, a fat and/or a wax preferably with a solvent and/or a plasticizer, extruding the kneaded material, drying the extruded articles to remove the solvent and/or the plasticizer therefrom and to thereby form open pores therein owing to the less wettability of the water/oil repellent substance, and then impregnating the porous articles with the oil, the fat and/or the wax.

In the present invention, the oil, the fat and/or the wax is not kneaded with the filler, the coloring agent, the binder and the like at the first step, in contrast to a conventional preparation process of the non-baked color pencil leads. For this constitution, there are advantages that the oil, the fat and/or the wax does not bleed even if the drying step is carried out at a temperature higher than the boiling point of the solvent, and that the drying time can be shortened remarkably as compared with the conventional case. Accordingly, it is necessary to select the coloring agent which does not thermally deteriorate even at such a high temperature and which is excellent in light resistance.

In the present invention, the oil, the fat and/or the wax is not kneaded with the other materials at the first step, and the water/oil repellent substance is instead added. After the drying step, the formed open pores are impregnated with the oil, the fat and/or the wax. Hence, the present invention has the following functions:

(1) The substance having the excellent water repellency and oil repellency has a large contact angle to the organic polymeric material as the binder, the solvent such as water and the plasticizer, so that the water/oil repellent substance is difficult to wet. Therefore, in the molded articles which can be obtained by kneading the water/oil repellent substance with the blend composition containing the filler, the coloring agent, the binder and the like as well as the solvent and/or the plasticizer, extruding the mixture, and then drying the extruded articles to remove the solvent and/or the plasticizer, the filler and the coloring agent are allowed to adhere together by the binder, but the water/oil repellent substance does not wet to the binder, with the results that open pores are formed in this portion, whereby the non-baked color pencil porous leads can be obtained.

The open pores permits the non-baked color pencil porous leads to be worn at drawing, though these leads have high mechanical strength. Furthermore, the open pores continuously connect with together to the central portion of each lead owing to the dispersion of the water/oil repellent substance and the porous leads can be impregnated with the oil, the fat and/or the wax. Owing to the impregnated oil, fat and/or wax, the leads can be more worn, thereby obtaining a smooth writing performance and an excellent staining power.

(2) When the wax or the like is kneaded with the blend composition containing the filler, the coloring agent, the binder and the like as in the conventional process for preparing the non-baked color pencil leads, the adhesion of the filler and coloring agent by the binder is partially impeded with the wax or the like, which permits the pencil lead to be worn at the drawing but simultaneously causes the noticeable deterioration of strength.

In the present invention, however, the water/oil repellent substance to be blended is used in a small amount, and therefore the strength decreases merely slightly. Since the oil, the fat and/or the wax is also introduced by the impregnation after the formation of the basic structure of the color pencil leads, the water/oil repellent substance does not cause the deterioration of the strength and instead exerts the effect of the wearing properties alone at the drawing.

Conversely, in the present invention, the open pores of the leads are filled up with the oil, the fat and/or the wax, and so there is the effect that the strength further increases.

As a result, the color pencil leads can be obtained which are much more excellent in physical properties such as bending strength and pointed end strength as compared with conventional color pencil leads.

(3) The various color pencil leads having different staining power, lubricating property, erasability, strength, hardness and the like can be obtained from one kind of non-baked color pencil porous leads by selectively using the oil, the fat and/or the wax to be impregnated.

That is, when the impregnation is made with the oil, the fat and/or the wax having a high sticky power to a paper which is solid at ordinary temperature, the conventional non-baked color pencil leads which cannot be erased with an eraser can be obtained; and when the impregnation is made with the oil, the fat and/or the wax having a low sticky power to the paper which is liquid at ordinary temperature, the non-baked color pencil leads which can be erased with the eraser can be obtained.

(4) Since the drying step is carried out for the articles in which the wax or the like is not contained yet, it is not necessary to take care of the bleed which takes place owing to the melting of the wax or the like, and a drying temperature can be raised up to a limit under which the thermal deterioration of the coloring agent does not occur, whereby the drying step can be achieved in a short period of time. This remarkable time curtailment of the drying step leads to the decrease of a manufacturing cost.

EXAMPLES

The present invention will be described in more detail in reference to examples, but the scope of the present invention should not be limited to these examples at all.

Example 1

| | |
|---|---|
| Carboxymethyl cellulose | 6% by weight |
| Talc | 69% by weight |
| Lake red pigment | 20% by weight |
| Graphite fluoride | 5% by weight |

Water was added to the above-mentioned blend composition in an amount equal to that of the composition, and they were mixed and dispersed by a kneader. Afterward, a water content was adjusted, while they were kneaded by the use of two rolls, and the kneaded material was pelleted and then extruded through a monoaxial screw type extruder. Next, the extruded articles were dried at 120° C. for 3 hours to remove water therefrom, thereby obtaining non-baked red color pencil porous leads having a diameter of 3.0 mm. These porous leads were then impregnated at 120° C. with synthetic japan wax to obtain non-baked red color pencil leads having a diameter of 3.0 mm. The results are set forth in Table 1.

Example 2

| Carboxymethyl cellulose | 6% by weight |
|---|---|
| Talc | 69% by weight |
| Lake red pigment | 20% by weight |
| PTFE powder | 5% by weight |

Water was added to the above-mentioned blend composition in an amount equal to that of the composition, and they were mixed and dispersed by a kneader. Afterward, a water content was adjusted, while they were kneaded by the use of two rolls, and the kneaded material was pelleted and then extruded through a monoaxial screw type extruder. Next, the extruded articles were dried at 120° C. for 3 hours to remove water therefrom, thereby obtaining non-baked red color pencil porous leads having a diameter of 3.0 mm. These porous leads were then impregnated at 120° C. with synthetic japan wax to obtain non-baked red color pencil leads having a diameter of 3.0 mm. The results are set forth in Table 1.

Comparative Example 1

| Carboxymethyl cellulose | 6% by weight |
|---|---|
| Talc | 74% by weight |
| Lake red pigment | 20% by weight |

Water was added to the above-mentioned blend composition in an amount equal to that of the composition, and they were mixed and dispersed by a kneader. Afterward, a water content was adjusted, while they were kneaded by the use of two rolls, and the kneaded material was pelleted and then extruded through a monoaxial screw type extruder. Next, the extruded articles were dried at 120° C. for 3 hours to remove water therefrom, thereby obtaining non-baked red color pencil porous leads having a diameter of 3.0 mm. These porous leads were then impregnated at 120° C. with synthetic japan wax to obtain non-baked red color pencil leads having a diameter of 3.0 mm. The results are set forth in Table 1.

Comparative Example 2

| Carboxymethyl cellulose | 6% by weight |
|---|---|
| Talc | 59% by weight |
| Lake red pigment | 15% by weight |
| Synthetic japan wax | 15% by weight |
| Grpahite fluoride | 5% by weight |

Water was added to the above-mentioned blend composition in an amount equal to that of the composition, and they were mixed and dispersed by a kneader. Afterward, a water content was adjusted, while they were kneaded by the use of two rolls, and the kneaded material was pelleted and then extruded through a monoaxial screw type extruder. Next, the extruded articles were dried at 50° C. for 60 hours to remove water therefrom, thereby obtaining non-baked red color pencil leads having a diameter of 3.0 mm. The results are set forth in Table 1.

Comparative Example 3

| Carboxymethyl cellulose | 7% by weight |
|---|---|
| Talc | 58% by weight |
| Lake red pigment | 15% by weight |
| Synthetic japan wax | 20% by weight |

Water was added to the above-mentioned blend composition in an amount equal to that of the composition, and they were mixed and dispersed by a kneader. Afterward, a water content was adjusted, while they were kneaded by the use of two rolls, and the kneaded material was pelleted and then extruded through a monoaxial screw type extruder. Next, the extruded articles were dried at 50° C. for 60 hours to remove water therefrom, thereby obtaining non-baked red color pencil leads having a diameter of 3.0 mm. The results are set forth in Table 1.

Example 3

| Cellulose acetate | 40% by weight |
|---|---|
| Talc | 35% by weight |
| Lake orange pigment | 20% by weight |
| Graphite fluoride | 5% by weight |

Methyl ethyl ketone was added to the above-mentioned blend composition in an amount equal to that of the composition, and they were mixed and dispersed by a kneader. Afterward, the solvent content was adjusted, while they were kneaded by the use of two rolls, and the kneaded material was pelleted and then extruded through a monoaxial screw type extruder. Next, the extruded articles were dried at 120° C. for 1 hour to remove the solvent therefrom, thereby obtaining non-baked orange color pencil porous leads having a diameter of 0.570 mm. These porous leads were then impregnated at 120° C. with stearic acid to obtain non-baked orange color pencil leads having a diameter of 0.570 mm. The results are set forth in Table 1.

Comparative Example 4

| Cellulose acetate | 35% by weight |
|---|---|
| Talc | 30% by weight |
| Lake orange pigment | 15% by weight |
| Calcium stearte | 20% by weight |

Methyl ethyl ketone was added to the above-mentioned blend composition in an amount equal to that of the composition, and they were mixed and dispersed by a kneader. Afterward, the solvent content was adjusted, while they were kneaded by the use of two rolls, and the kneaded material was pelleted and then extruded through a monoaxial screw type extruder. Next, the extruded articles were dried at 50° C. for 20 hours to remove the solvent therefrom, thereby obtaining non-baked orange color pencil leads having a diameter of 0.570 mm. The results are set forth in Table 1.

Example 4

The non-baked pencil porous leads in Example 1 were impregnated at 120° C. with α-olefin oligomer to obtain non-baked red color pencil leads having a diameter of 3.0 mm. The results are set forth in Table 1.

Example 5

| | |
|---|---|
| Carboxymethyl cellulose | 6% by weight |
| Talc | 69% by weight |
| Lake red pigment | 20% by weight |
| Boron nitride | 5% by weight |

Water was added to the above-mentioned blend composition in an amount equal to that of the composition, and they were mixed and dispersed by a kneader. Afterward, a water content was adjusted, while they were kneaded by the use of two rolls, and the kneaded material was pelleted and then extruded through a monoaxial screw type extruder. Next, the extruded articles were dried at 120° C. for 3 hours to remove water therefrom, thereby obtaining non-baked red color pencil porous leads having a diameter of 3.0 mm. These porous leads were then impregnated at 120° C. with α-olefin oligomer to obtain non-baked red color pencil leads having a diameter of 3.0 mm. The results are set forth in Table 1.

Comparative Example 5

| | |
|---|---|
| Polyethylene | 20% by weight |
| Talc | 20% by weight |
| Lake red pigment | 15% by weight |
| Paraffin wax | 35% by weight |
| Candelilla wax | 10% by weight |

The above-mentioned blend composition was mixed and dispersed by a kneader, and afterward it was kneaded by the use of two rolls. The resultant mixture was pelleted and then extruded through a monoaxial screw type extruder, thereby obtaining non-baked red color pencil leads having a diameter of 3.0 mm. The results are set forth in Table 1.

Example 6

The non-baked pencil porous leads in Example 3 were impregnated at 120° C. with α-olefin oligomer to obtain non-baked orange color pencil leads having a diameter of 0.570 mm. The results are set forth in Table 1.

Comparative Example 6

| | |
|---|---|
| Tragacanth gum | 5% by weight |
| Kaolinite clay | 45% by weight |
| Boron nitride | 50% by weight |

Water was added to the above-mentioned blend composition in an amount equal to that of the composition, and they were mixed and dispersed by a kneader. Afterward, a water content was adjusted, while they were kneaded by the use of two rolls, and the kneaded material was extruded through a plunger type extruder. Next, the molded articles were dried at 150° C. for 1 hour to remove water therefrom, heated up to 1100° C. in an argon gas, and then calcined at 1100° C. for 1 hour. They were further calcined at 700° C. for 3 hours in an oxygen atmosphere, thereby obtaining baked white color pencil porous leads having a diameter of 0.570 mm. These porous leads were then impregnated with a non-volatile oily orange dye ink to obtain baked orange color pencil leads having a diameter of 0.570 mm. The results are set forth in Table 1.

Example 7

The non-baked pencil porous leads in Example 1 were impregnated at 120° C. with caster wax to obtain non-baked red color pencil leads having a diameter of 3.0 mm. The results are set forth in Table 1.

TABLE 1

| | Bending[1] Strength gf/mm$^2$ | Impregnation Ratio[2] % | Drying Time hr | Erasability |
|---|---|---|---|---|
| Example 1 | 7,800 | 16.8 | 3 | |
| Example 2 | 7,200 | 15.0 | 3 | |
| Example 3 | 14,400 | 15.1 | 1 | |
| Example 4 | 6,600 | 17.1 | 3 | o |
| Example 5 | 6,700 | 15.5 | 3 | o |
| Example 6 | 13,100 | 14.9 | 1 | o |
| Example 7 | 7,900 | 16.5 | 3 | |
| Comp. Ex. 1 | 6,900 | 2.0 | 3 | |
| Comp. Ex. 2 | 4,000 | — | 60 | |
| Comp. Ex. 3 | 4,500 | — | 60 | |
| Comp. Ex. 4 | 10,400 | — | 20 | |
| Comp. Ex. 5 | 2,300 | — | — | Δ |
| Comp. Ex. 6 | 9,900 | 12.6 | 1 | o |

[1] It was measured in accordance with JIS-S-6005-1989.
[2] The impregnation ratio = [(weight after the impregnation/weight before the impregnation) − 1] × 100 (%)

Erasability
o means "erasable as easily as baked black leads for pencils"
Δ means "not so easily as baked black leads for pencils"

| | Unerasability | Light Resistance | Hardness | Writing Performance |
|---|---|---|---|---|
| Example 1 | o | o | Medial | o |
| Example 2 | o | o | Medial | o |
| Example 3 | o | o | Hard | o |
| Example 4 | | o | Medial | o |
| Example 5 | | o | Medial | o |
| Example 6 | | o | Hard | o |
| Example 7 | o | o | Hard | o |
| Comp. Ex. 1 | o | o | Hard | x |
| Comp. Ex. 2 | o | o | Medial | o |
| Comp. Ex. 3 | o | o | Medial | o |
| Comp. Ex. 4 | o | o | Hard | Δ |
| Comp. Ex. 5 | | o | Soft | Δ |
| Comp. Ex. 6 | x | | Hard | Δ |

Unerasability
o means "unerasable"
Light Resistance
o means "good"
x means "bad"
Writing Performance
o means "smooth"
Δ means "not so smooth"
x means "rough"

What is claimed is:

1. Non-baked color pencil leads obtained by kneading a blend composition comprising a water/oil repellent substance in an amount of 2 to 20% by weight based on the total weight of the blend composition; a binder selected from the group consisting of cellulose derivatives, polyvinyl alcohol, polyvinyl butyral, polymethyl methacrylate, tragacanth gum, gum arabic, cyamoposis gum, gum dammer, and locust bean gum; a solvent for the binder; a coloring agent and a filler; extruding the kneaded material to yield an extruded article; drying the extruded article at a temperature higher than the boiling point of the solvent for the binder but less than a temperature at which thermal deterioration of the coloring agent occurs to yield open pores in the water/oil repellent substance; and impregnating the open pores in the circumference of the water/oil repellent substance with an oil, a fat and/or a wax.

2. The non-baked color pencil leads according to claim 1 wherein the water/oil repellent substance is selected from the group consisting of graphite fluoride, carbon fluoride, a fluororesin powder, graphite and boron nitride.

3. The non-baked color pencil leads according to claim 2, wherein the fluororesin powder comprises polytetrafluoroethylene (PTFE).

4. The non-baked color pencil leads according to claim 1, wherein the filler is selected from the group consisting of talc, clay, and calcium carbonate.

5. The non baked color pencil leads according to claim 1 wherein the oil, the fat and/or the wax is selected from the group consisting of silicone oil, mineral oils, liquid paraffin, α-olefin oligomer, lard, petroleum waxes, carnauba wax, candelilla wax, montan wax, bee's wax, japan wax, synthetic japan wax, caster wax and stearic acid.

6. A method for preparing non-baked color pencil leads which comprises the steps of kneading a blend composition comprising a water/oil repellent substance in an amount of 2 to 20% by weight based on the total weight of the blend composition; a binder selected from the group consisting of cellulose derivatives, polyvinyl alcohol, polyvinyl butyral, polymethyl methacrylate, tragacanth gum, gum arabic, cyamoposis gum, gum dammer, and locust bean gum; a solvent for the binder; a coloring agent and a filler with a solvent extruding the kneaded material to yield an extruded article; drying the extruded article at a temperature higher than the boiling point of the solvent for the binder but less than the temperature at which thermal deterioration of the coloring agent occurs to yield open pores in the water/oil repellant substance; and impregnating the open pores in the circumference of the water/oil repellent substance with an oil, a fat and/or a wax.

7. The method for preparing non-baked color pencil leads according to claim 6 wherein the water/oil repellent substance is selected from the group consisting of graphite fluoride, carbon fluoride, a fluororesin powder, a graphite, and boron nitride.

8. The method for preparing non-baked color pencil leads according to claim 7, wherein said fluororesin powder comprises polytetrafluoroethylene (PTFE).

9. The method for preparing non-baked color pencil leads according to claim 6 wherein the solvent comprises a compound which can dissolve or swell the binder and is selected from the group consisting of water, a ketone, an alcohol, and a low-boiling point ester.

10. The non-baked color pencil lead according to claim 1 wherein said cellulose derivative is selected from the group consisting of carboxymethyl cellulose, methyl cellulose, ethyl cellulose, hydroxyethyl cellulose, hydroxypropyl cellulose, and cellulose acetate.

11. The non-baked color pencil lead according to claim 4 wherein said clay is kaolin.

12. The non-baked color pencil lead according to claim 5 wherein said petroleum wax is selected from the group consisting of paraffin wax and microcrystalline wax.

13. The method for preparing non-baked color pencil leads according to claim 6, wherein a plasticizer compatible with the binder is added to the blend composition, the plasticizer selected from the group consisting of a phosphoric ester, a phthalic ester, an ester of an aliphatic acid and a divalent alcohol ester.

* * * * *